Oct. 15, 1929.  E. J. ALLEN  1,731,604

ICE AND BUTTER SERVER

Filed Jan. 19, 1928

Inventor

Edna J. Allen

By Thomas Bieyer

Attorney

Patented Oct. 15, 1929

1,731,604

UNITED STATES PATENT OFFICE

EDNA J. ALLEN, OF PORTLAND, OREGON

ICE AND BUTTER SERVER

Application filed January 19, 1928. Serial No. 247,919.

The primary object of my invention consists in providing a suitable means primarily adapted for use in hotels, restaurants, public and private eating places, and other places where butter and like substances are being served in small units and wherein simultaneously therewith cracked ice is also being served.

The device consists in a primary receptacle adapted for carrying liquids therein and having a central carrying element or bail with which the same is supported and a false bottom being disposed within the primary receptacle adapted to support and maintain a butter holder central the false bottom and the primary receptacle; the upper surface of the butter holder preferably extending above the walls of the primary receptacle. A space is disposed between the walls of the primary receptacle and the walls of the butter holder for the carrying of ice and means being provided upon the bail or handle for supporting tongs adapted to serving the cracked ice and butter.

A further object of my device consists in providing a device adapted for the carrying of ice particles in spaced relationship with the body element unit and having provided central of the primary unit a device for maintaining butter therein; the ice serving to maintain the butter in a highly savory condition independent of the primary receptacle in which the ice is to be maintained.

A further object of my new and improved device consists in providing means adapted for use in public and private eating places wherein it is desired to serve butter to the patrons in individual units in a highly savory condition and at the same time means for delivering to the patrons cracked ice in a sanitary, and savory condition, the ice and butter to be served directly to the patrons.

Still further objects of my new and improved device consists in providing an ice and butter server that is relatively simple of construction, composed of a limited number of parts, and one that may be used over relatively long periods free from operating annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
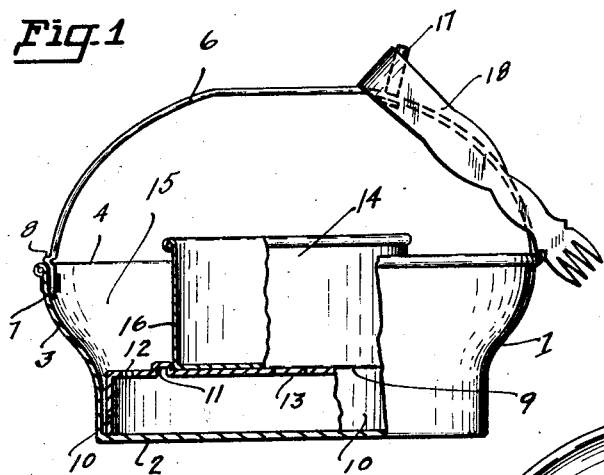
Fig. 1 is a side elevation, partially in section of the assembled device.
Figure 4:
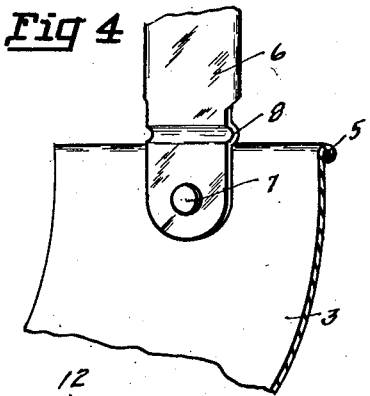
Fig. 4 is a perspective side elevation, illustrating a preferred form of attaching the bail to the primary receptacle.

I preferably form the body portion 1 of the primary receptacle of sheet material, having a bottom 2, and having outwardly sloping side walls 3, terminating in the rim projection 4, adjacent the upper edge thereof, wherein a projecting ledge 5, extends circumferentially of the rim portion of the primary receptacle. A supporting bail 6 is secured to the body portion of the receptacle by any suitable fastening means, as by rivets 7. A slight groove 8 is disposed within the bail portion which is in registerable alignment with the ledge 5, of the body portion of the device so that when the bail is raised into normal central position the same may be made to engage the ledge 5, and to lock the same into fixed relation with the body portion. A false bottom 9 is placed within the body portion of the device having a downwardly extending circumferential skirt 10 adapted to engage on its lower edge with the bottom 2 of the body portion of the device, the diameter of the skirt portion being substantially the diameter on its outside to the inside diameter of the base of the body element. An upwardly extending annular ring 11 is disposed central of the horizontal portion of the false bottom and a series of drain holes are disposed about the horizontal portion of the false bottom. A central opening 13 extending through the horizontal portion, the purpose and object of the drain holes is to permit of the draining of the liquid developed from the melting ice occupying the space formed by the spaced relationship between the bottom of the body element and the upper portion of the false bottom, thus permitting a serving of ice in a savory and sanitary condition. A butter holder 14 is placed upon the false bottom and the same should be made slightly smaller in diameter than the inside of the ring 11 to facilitate the maintaining of the butter holder central of the body element and central of the false bottom. The ring 11 should be made sufficiently high to maintain the butter holder in normal position, the ice being placed within the space 15 existent between the side walls 3 of the body element and the side walls 16 of the butter holder. In order to prevent drainage of the liquid formed by the melting ice becoming deposited within the butter, the top surface of the butter holder should extend above the rim of the body element. To prevent drainage from the butter entering or getting into the ice or the melted ice being deposited within the base of the body element, the butter holder should be made relatively liquid tight. In order to serve the butter and the ice in a sanitary and savory condition it is desirable to handle the same with suitable devices, adapted to the handling of such materials.

Figure 5:
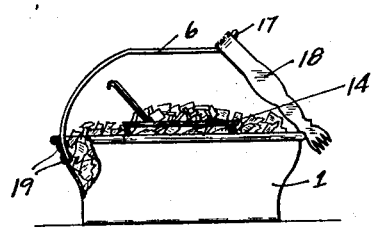
Fig. 5 is a side elevation, partially in section of the device in preferred form, having ice particles and butter disposed therein.
Figure 2:
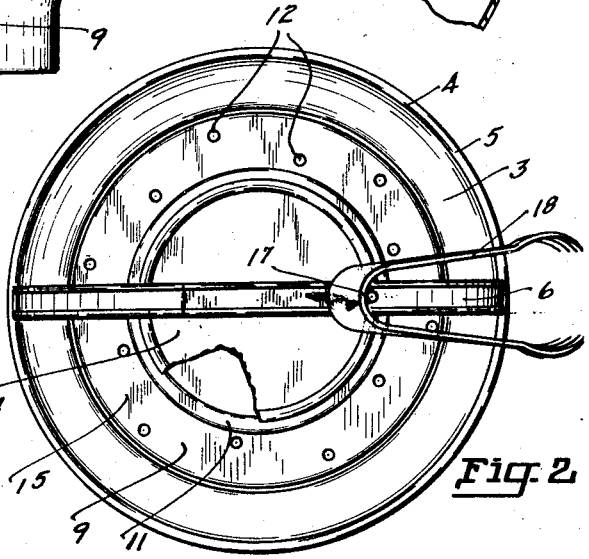
Fig. 2 is a top, plan view, of the mechanism illustrated in Fig. 1.
Figure 6:
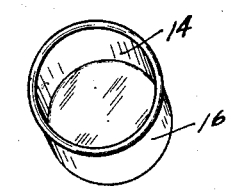
Fig. 6 is a perspective view of the butter receptacle, shown removed from the assembled device.
Figure 7:
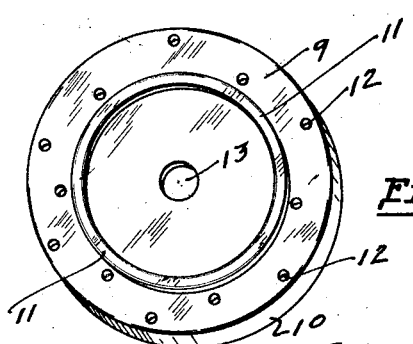
Fig. 7 is a perspective view of the false bottom upon which the butter receptacle is to be placed illustrating the preferred form of embodiment for maintaining the butter holder and the primary holder in spaced relationship with each other.
Figure 3:
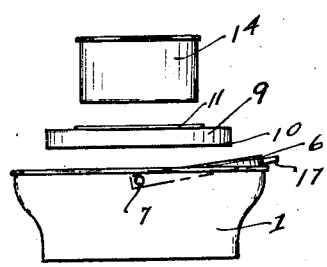
Fig. 3 is a side elevation of the primary receptacle showing the bail in lowered position and illustrating the false bottom and the butter holder in position for being deposited within the primary receptacle.

I have found satisfactory results obtained wherein a post 17 is placed within the bail 6 upon which the tongs 18 may be placed for handling the same. In Fig. 1, I have shown the bail as being disposed outside of the body element 1, but I do not wish to be limited to this specific form of construction for the bail may be attached, as illustrated in Fig. 5, relatively fixed to that of the body element and secured thereto by one or more fastening elements, as rivets 19.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, the combination of a bottomed body element having outwardly sloping side walls, a ledge disposed about the peripheral edge of the side walls, a bail adapted to oppositely disposed sides of the body element, a false bottom disposed within the body element the horizontal surface of which is in spaced relation with the bottom of the body element, a ring upwardly extending from the top surface of the false bottom, drain holes disposed in the top surface of the false bottom and a butter holder removably disposed upon the false bottom and adapted for fitting within the ring element upwardly extending from the top surface of the false bottom.

2. In a device of the class described, the combination of an annular one piece body element having outwardly extending side walls and adapted to holding liquids therein, a supporting bail hingedly disposed upon the body element, said bail having a straight hand engaging portion and a tong supporting post, a false bottom element, the upper surface of which is disposed in spaced relation with the bottom of the body element, drainage elements disposed through the horizontally disposed surface of the false removable bottom element, and a butter holder centrally disposed upon the horizontal portion of the false bottom the upper edge of which extends above the surface of the body element.

3. In a device of the class described, the combination of a body element, a perforated false bottom horizontally disposed within the body element and in spaced relation with the bottom of the body element, means for removing said false bottom, and a removable butter holder centrally disposed within the body element, a supporting bail hingedly disposed upon the body element, and means for maintaining said bail in a normal central position.

EDNA J. ALLEN.